United States Patent [19]
Shirk et al.

[11] Patent Number: 6,056,314
[45] Date of Patent: May 2, 2000

[54] INITIATOR RETAINER FOR AIR BAG INFLATOR

[75] Inventors: Bryan W. Shirk, Mesa; Jess A. Cuevas, Scottsdale; Ahmad K. Al-Amin, Higley; Timothy A. Swann, Mesa; Roy D. Van Wynsberghe, Mesa; Thomas H. Deming, Mesa, all of Ariz.

[73] Assignee: TRW Inc., Lyndhurst, Ohio

[21] Appl. No.: 09/027,142

[22] Filed: Feb. 20, 1998

[51] Int. Cl.[7] .................................................. B60R 21/16
[52] U.S. Cl. ...................... 280/728.2; 280/728.1
[58] Field of Search .................... 280/741, 736, 280/728.2; 102/530, 531

[56] References Cited

U.S. PATENT DOCUMENTS 5,131,679  7/1992  Novak et al. .......................... 280/736
5,269,560  12/1993  O'Loughlin et al. .

*Primary Examiner*—Lanna Mai
*Assistant Examiner*—Kevin McKinley
*Attorney, Agent, or Firm*—Tarolli, Sundheim, Covell, Tummino & Szabo L.L.P.

[57] ABSTRACT

An apparatus (10) for inflating an inflatable vehicle occupant protection device (12) includes a housing (16, 40) defining a chamber (30). An actuatable inflation fluid source (80) in the chamber (30) provides inflation fluid for inflating the inflatable device (12). A body of plastic material (50) is supported on the housing (40). An electrically energizable initiator (90), when energized, causes inflation fluid to flow from the chamber (30). A retainer (120) mounts the initiator (90) to the housing (40). The retainer (120) has a first portion (130) engaging the initiator (90) and securing the initiator to the retainer. The retainer (120) has a second portion (132) engaging the body of plastic material (50) and securing the retainer to the body of plastic material.

16 Claims, 3 Drawing Sheets

INITIATOR RETAINER FOR AIR BAG INFLATOR

BACKGROUND OF THE INVENTION

1. Technical Field

The present invention relates to an apparatus for inflating an inflatable vehicle occupant protection device, such as an air bag. In particular, the present invention relates to a retainer for mounting an electrically actuatable initiator to a housing of an air bag inflator.

2. Description of the Prior Art

U.S. Pat. No. 5,269,560 describes an inflator for inflating an air bag. The inflator includes a housing. An igniter is actuatable to ignite gas generating material in the housing. A metal weld adaptor is welded to the housing. A body of injection molded plastic material adheres to both the igniter and the weld adaptor to attach the igniter to the weld adaptor. The weld adaptor is welded to a cover part of the housing.

U.S. Pat. No. 5,131,679 describes an inflator for inflating an air bag. The inflator includes a housing. An igniter is actuatable to ignite gas generating material in the housing. The housing includes a cover. A body of injection molded plastic material adheres to both the igniter and the cover to attach the igniter to the cover. The cover is welded to the other parts of the housing.

SUMMARY OF THE INVENTION

The present invention is an apparatus for inflating an inflatable vehicle occupant protection device. The apparatus includes a housing defining a chamber, and an actuatable inflation fluid source in the chamber providing inflation fluid for inflating the inflatable device. A body of plastic material is supported on the housing. The apparatus also includes an electrically energizable initiator for, when energized, causing inflation fluid to flow from the chamber, and a retainer for mounting the initiator to the housing. The retainer has a first portion engaging the initiator and securing the initiator to the retainer. The retainer has a second portion engaging the body of plastic material and securing the retainer to the body of plastic material.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
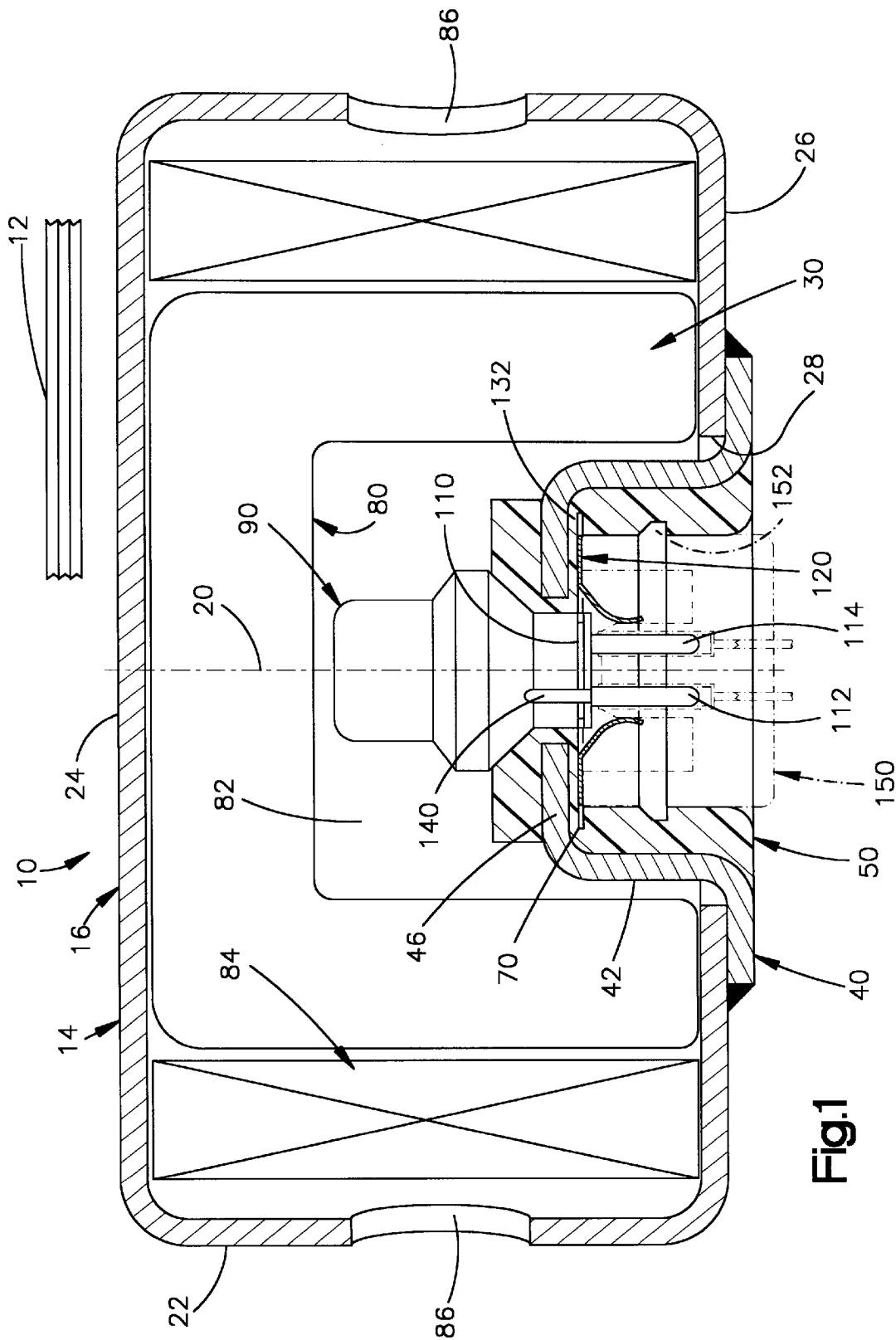
FIG. 1 is a schematic illustration of an air bag inflator constructed in accordance with the present invention.

The present invention relates to an apparatus for inflating an inflatable vehicle occupant protection device, such as an air bag. In particular, the present invention relates to a retainer for mounting an electrically actuatable initiator to a housing of an air bag inflator. As representative of the present invention, FIG. 1 illustrates an inflator 10 for inflating an inflatable vehicle occupant protection device, or air bag, illustrated schematically at 12.

The inflator 10 includes a metal housing 14. A main body portion 16 of the housing 14 is cylindrical in configuration and is centered on an axis 20 of the inflator 10. The main body portion 16 includes a cylindrical, axially extending side wall 22 and a radially extending first end wall 24. A radially extending second end wall 26 defines an opening 28 into a chamber 30 in the housing 14.

Figure 2:
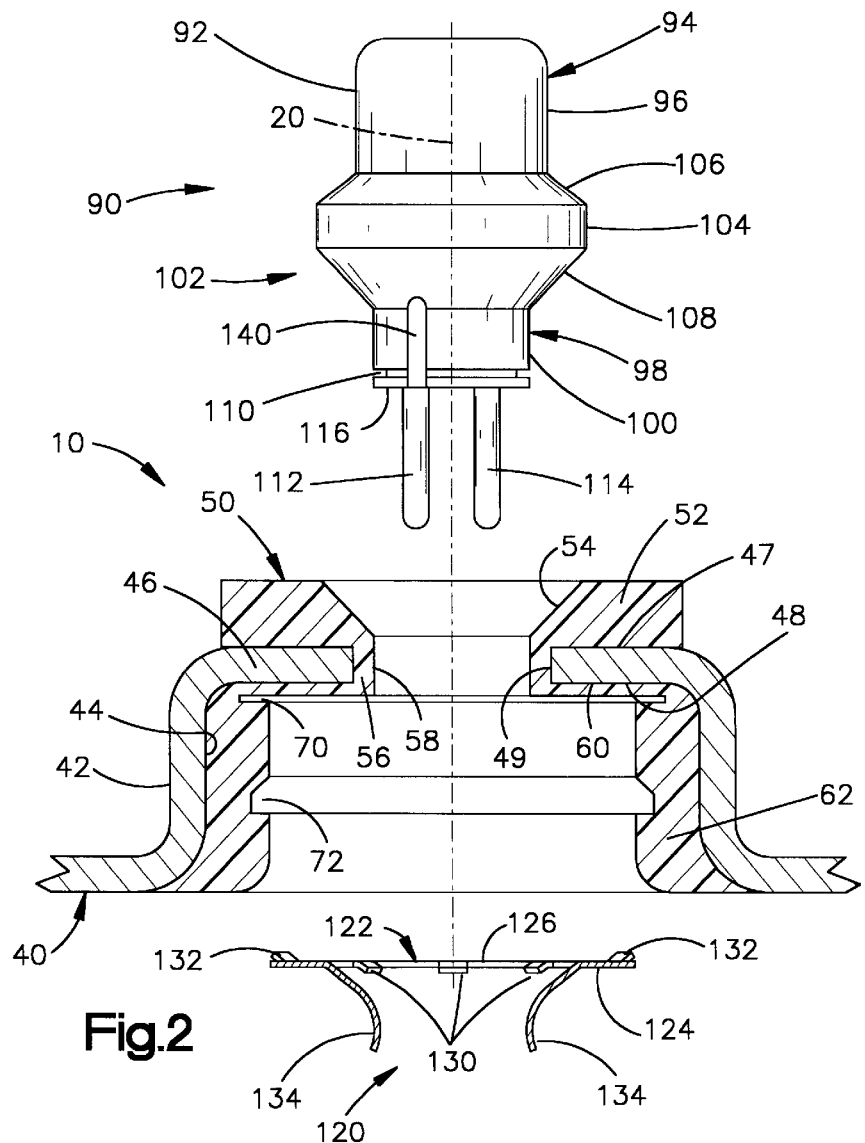
FIG. 2 is an exploded view, partially in section, of parts of the inflator of FIG. 1 including an initiator, a portion of a housing, and a retainer for mounting the initiator to the housing.

The housing 14 includes a cover 40 which closes the opening 28. The cover 40 includes a cylindrical, axially extending side wall 42 with a cylindrical inner side surface 44 (FIG. 2). The cover 40 also includes a planar, radially extending end wall 46. The end wall 46 has annular inner and outer side major side surfaces 47 and 48 joined by a cylindrical, axially extending edge surface 49. The edge surface 49 defines a circular opening in the end wall 46 of the cover 40.

A body of plastic material 50, such as a thermoplastic resin, is injection molded on the cover 40. The body of plastic material 50 encases the end wall 46 of the cover 40 and is also partially disposed inside the side wall 42 of the cover.

A first portion 52 of the body of plastic material 50 is disposed on, or overlies, the inner major side surface 47 of the end wall 46 of the cover 40. The first portion 52 has a frustoconical surface 54 centered on the axis 20 and presented axially inward of the cover 40.

A second portion 56 of the body of plastic material 50 is disposed on, or overlies, the inner edge surface 49 of the end wall 46 of the cover 40. The second portion 56 defines a circular opening 58 in the body of plastic material 50. The opening 58 is centered on the axis 20.

A third portion 60 of the body of plastic material 50 is disposed on, or overlies, the outer major side surface 48 of the end wall 46 of the cover 40. A fourth portion 62 of the body of plastic material 50 is disposed on, or overlies, the inner side surface 44 of the side wall 42 of the cover 40.

An annular outer retainer groove 70 is formed in the body of plastic material 50. The outer retainer groove 70 is disposed between the third and fourth portions 60 and 62 of the body of plastic material 50. An annular connector locking groove 72 is formed in the fourth portion 62 of the body of plastic material 50.

An actuatable inflation fluid source indicated schematically at 80 is disposed in the chamber 30 in the housing 14. The inflation fluid source 80 is of a known construction and preferably includes an ignitable material which, when ignited, produces inflation fluid in the form of gas. The inflation fluid source 80 may, alternatively, comprise a quantity of gas stored under pressure and possibly an ignitable material for, when ignited, increasing the pressure and volume of the stored gas. The inflation fluid source 80 defines a central recess 82 in the inflator. A filter assembly indicated schematically at 84 extends between the inflation fluid source 80 and an array of inflation fluid outlets 86 in the side wall 22 of the main body portion 16 of the housing 14.

The inflator 10 includes an igniter or initiator 90 for actuating the inflation fluid source 80. The initiator 90 includes energizable electrical components (not shown) of a known construction for, when energized by an appropriate electric signal, generating combustion products sufficient to actuate the inflation fluid source 80.

The outside surface of the initiator 90 comprises a plastic material covering 92. The plastic material covering 92 is formed by a known plastic molding process which encases the electrical components of the initiator 90 in a protective, electrically insulating material.

The initiator 90 has an axially inner end portion 94 with a cylindrical outer surface 96. The initiator 90 also has an axially outer end portion 98 with a cylindrical outer surface 100. A central portion 102 of the initiator 90 has a cylindrical outer surface 104. A frustoconical surface 106 tapers radially inward from the cylindrical outer surface 104 to the cylindrical outer surface 96 of the axially inner end portion 94 of the initiator 90. Another frustoconical surface 108 tapers radially inward from the cylindrical outer surface 104 to the cylindrical outer surface 100 of the axially outer end portion 98 of the initiator 90.

An inner retainer groove 110 is formed in the cylindrical outer surface 100 of the outer end portion 98 of the initiator 90. The inner retainer groove 110 extends radially inward from the cylindrical outer surface 100 of the outer end portion 98 of the initiator 90. The inner retainer groove 110 is formed during the process of molding the plastic material covering 92 on the initiator 90.

First and second terminals 112 and 114 of the initiator 90 project axially outward from an outer end surface 116 of the initiator. The terminals 112 and 114 are connectable, in a manner described below, with vehicle electric circuitry for receiving an electric current for energizing the initiator 90.

The inflator 10 also includes a retainer 120 for securing the initiator 90 to the housing. The retainer 120 is made from an electrically conductive material, preferably a metal such as beryllium copper. The retainer 120 is formed as one piece and has an annular configuration, shaped generally like a star washer.

The retainer 120 has a planar, annular main body portion 122 with parallel, axially outer and inner major side surfaces 124 and 126. The main body portion 122 of the retainer 120 has a circular central opening 128.

A plurality of inner tabs 130 project radially inward from the main body portion 122 of the retainer 120. In the illustrated embodiment, the retainer 120 has six inner tabs 130 spaced equally about the axis 20 in a circular array. The inner tabs 130 do not lie in the plane of the main body portion 122 but instead project at an angle of about 30° axially outward (downward as viewed in FIG. 2) when the retainer 120 is in a free condition as shown in FIG. 2. The inner tabs 130 are resiliently deflectable from this condition into the plane of the main body portion 122 of the retainer 120.

A plurality of outer tabs 132 project radially outward from the main body portion 122 of the retainer 120. In the illustrated embodiment, the retainer 120 has six outer tabs 132 spaced equally about the axis 20 in a circular array. The outer tabs 132 do not lie in the plane of the main body portion 122 but instead project at an angle of about 30° axially inward (upward as viewed in FIG. 2) when the retainer 120 is in a free condition as shown in FIG. 2. The outer tabs 132 are resiliently deflectable from this condition into the plane of the main body portion 122 of the retainer 120.

Figure 3:
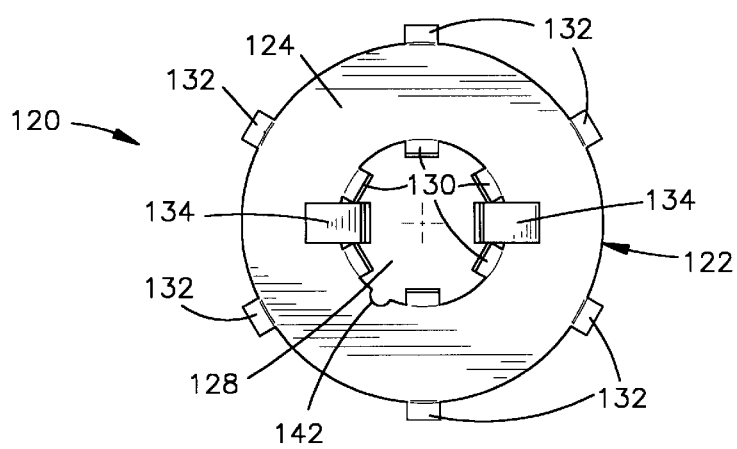
FIG. 3 is a plan view of the retainer of FIG. 2.

The retainer 120 also includes two wiper arms 134 which are disposed 180 degrees apart from each other circumferentially around the main body portion 122 of the retainer. The wiper arms 134 project axially outward and radially inward from the main body portion 122 of the retainer 120. The wiper arms 134 are resiliently deflectable radially outward from their free position shown in FIG. 3.

To assemble the initiator 90 into the inflator 10, the initiator is moved into engagement with the body of plastic material 50 on the cover 40. The frustoconical surface 108 on the initiator 90 engages the frustoconical surface 54 on the first portion 52 of the body of plastic material 50. The outer end portion 98 of the initiator 90 extends through the opening 58 in the body of plastic material 50 on the cover 40. The inner retainer groove 110 on the initiator 90 is disposed radially inward of the outer retainer groove 70 on the body of plastic material 50.

An axially extending rib 140 (FIGS. 1 and 2) on the outer end portion 98 of the initiator 90 engages a complementary groove (not shown) on the body of plastic material 50 to align the initiator 90 circumferentially about the axis 20. This alignment places the terminals 112 and 114 of the initiator 90 in a proper orientation for connection with vehicle electric circuitry as described below.

Figure 4:
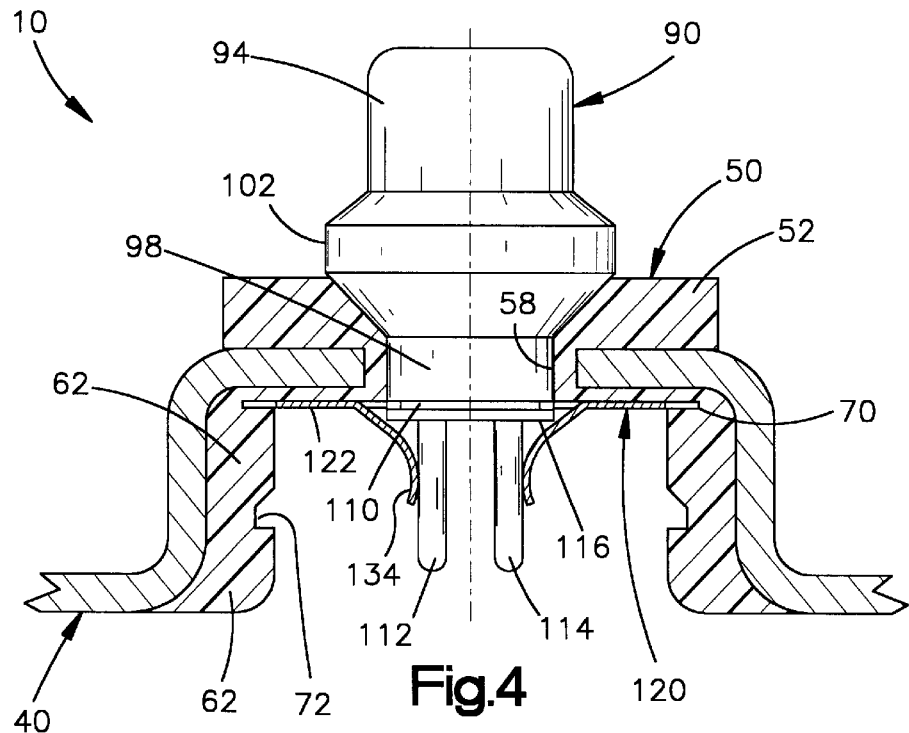
FIG. 4 is a sectional view showing the inflator parts of FIG. 2 in an assembled condition.
Figure 5:
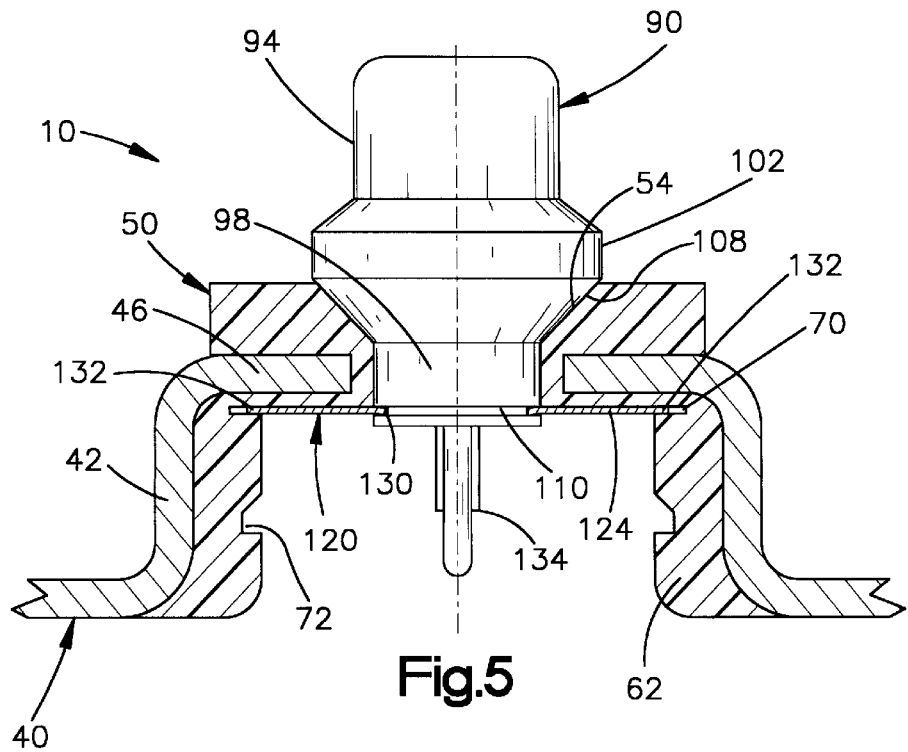
FIG. 5 is another sectional view, taken at 90 degrees to FIG. 4, showing the inflator parts of FIG. 2 in the assembled condition.

The retainer 120 is then moved to the engaged position shown in FIGS. 4 and 5. The outer end portion 98 of the initiator 90 extends through the central opening 128 in the retainer 120. A notch 142 in the main body portion 122 of the retainer 120 receives the rib 140 on the initiator 90 to ensure proper circumferential orientation of the retainer relative to the initiator.

When the retainer 120 is in the engaged condition shown in FIGS. 4 and 5, the inner tabs 130 of the retainer resiliently engage in the inner retainer groove 110 on the outer end portion 98 of the initiator 90. As a result, the initiator 90 is secured to the retainer 120. The outer tabs 132 of the retainer 120 resiliently engage in the outer retainer groove 70 on the body of plastic material 50 on the cover 40. As a result, the retainer 120 is secured to the body of plastic material 50 and, thereby, to the cover 40. The retainer 120 thus secures the initiator 90 to the cover 40, without welding or other type of fastening.

The resilience of the tabs 130 and 132 of the retainer 120 helps to maintain the initiator 90 in position on the cover 40. Specifically, the inner tabs 130 of the retainer 120 are deflected axially inward, away from their free position, when the inner tabs 130 engage in the inner retainer groove 110 of the initiator 90. The resilience of the inner tabs 130 attempts to return the inner tabs to their free position. The biasing force of the deflected inner tabs 130 is transmitted to the outer end portion 98 of the initiator 90 and urges the initiator 90 axially outward, into tighter engagement with the body of plastic material 50.

At the same time, the outer tabs 132 of the retainer 120 are deflected axially outward, away from their free position, when the retainer engages in the outer retainer groove 70 in the body of plastic material 50. The resilience of the outer tabs 132 attempts to return the outer tabs to their free position. The biasing force of the deflected outer tabs 132 urges the retainer 120 axially inward, into tighter engagement with the body of plastic material 50.

When the parts of the inflator 10 are in the assembled condition shown in FIGS. 4 and 5, the wiper arms 134 on the retainer 120 engage the terminals 112 and 114. The engagement of the wiper arms 134 with the terminals 112 and 114 completes an electric circuit between the terminals through the metal of the retainer 120. The retainer 120 thus acts as a shorting clip to prevent accidental firing of the initiator 90 due to stray electrical currents prior to assembly of the inflator 10 into the vehicle.

The cover 40 of the inflator 10 is welded to the main body portion 16 of the housing 14 when the other parts of the inflator, including the filter assembly 84 and the inflation fluid source 80, are already assembled in the housing. When the cover 40 is welded to the main body portion 16 of the housing 14, the initiator 90 is in the desired position inside the recess 82, adjacent to the inflation fluid source 80. The body of plastic material 50 electrically insulates between the housing 14 and the retainer 120. The plastic material covering 92 of the initiator 90 electrically insulates between the retainer 120 and the terminals 112 and 114.

Upon subsequent assembly of the inflator 10 in a vehicle, an electrical connector 150 is moved into the position shown in FIG. 1. An annular rib 152 on the outer periphery of the connector 150 engages in the connector locking groove 72 in the body of plastic material 50. This engagement locks the connector 50 in place on the inflator 10.

As the connector 150 is being attached, the body of the connector moves the wiper arms 134 away from the terminals 112 and 114. Metal sleeves in the connector 150 make contact with the terminals 112 and 114 to form the desired electric connection between the initiator 90 and the vehicle electric circuitry (not shown) for energizing the initiator.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for inflating an inflatable vehicle occupant protection device, said apparatus comprising:
    a housing defining a chamber;
    an actuatable inflation fluid source in said chamber providing inflation fluid for inflating the inflatable device;
    a body of plastic material supported on said housing;
    an electrically energizable initiator for, when energized, causing inflation fluid to flow from said chamber; and
    a retainer for mounting said initiator to said housing;
    said retainer having a first portion engaging said initiator and securing said initiator to said retainer;
    said retainer having a second portion engaging said body of plastic material and securing said retainer to said body of plastic material.

2. An apparatus as set forth in claim 1 wherein said body of plastic material is molded onto a metal portion of said housing.

3. An apparatus as set forth in claim 1 wherein said body of plastic material has a groove in which said retainer is received to secure said retainer to said body of plastic material.

4. An apparatus as set forth in claim 1 wherein said retainer has an annular configuration including a central opening through which a portion of said initiator extends.

5. An apparatus as set forth in claim 1 wherein said housing is made from metal, said retainer is made from metal, said retainer engaging a plastic portion of said initiator, said body of plastic material electrically insulating between said housing and said retainer.

6. An apparatus as set forth in claim 3 wherein said initiator has a groove in which said retainer is received to secure said initiator to said retainer.

7. An apparatus for inflating an inflatable vehicle occupant protection device, said apparatus comprising:
    a housing defining a chamber;
    an actuatable inflation fluid source in said chamber providing inflation fluid for inflating the inflatable device;
    a body of plastic material supported on said housing;
    an electrically energizable initiator for, when energized, causing inflation fluid to flow from said chamber; and
    a retainer for mounting said initiator to said housing, said retainer having an annular configuration including a central opening through which a portion of said initiator extends, said retainer further having a first portion and a second portion;
    said first portion engaging said initiator and securing said initiator to said retainer;
    said second portion engaging said body of plastic material and securing said retainer to said body of plastic material,
    said first portion of said retainer comprising a first plurality of tabs extending radially inward into said central opening and engaging said initiator, said second portion of said retainer comprising a second plurality of tabs which engage said body of plastic material.

8. An apparatus for inflating an inflatable vehicle occupant protection device, said apparatus comprising:
    a housing defining a chamber;
    an actuatable inflation fluid source in said chamber providing inflation fluid for inflating the inflatable device;
    a body of plastic material supported on said housing;
    an electrically energizable initiator for, when energized, causing inflation fluid to flow from said chamber; and
    a retainer for mounting said initiator to said housing, said retainer having a first portion and a second portion;
    said first portion engaging said initiator and securing said initiator to said retainer;
    said second portion engaging said body of plastic material and securing said retainer to said body of plastic material,
    said first portion of said retainer comprising a first plurality of tabs which engage said initiator and said second portion of said retainer comprising a second plurality of tabs which engage said body of plastic material.

9. An apparatus for inflating an inflatable vehicle occupant protection device, said apparatus comprising:
    a housing including a main portion defining a chamber and having an opening into said chamber;
    said housing further including a cover for closing said opening;
    a body of plastic material molded on said cover;
    an actuatable inflation fluid source in said chamber;
    an electrically energizable initiator for actuating said inflation fluid source; and
    a retainer for mounting said initiator to said housing in a position projecting into said chamber in said housing, said retainer comprising a part separate from said cover;
    said retainer having a first portion engaging said initiator and securing said initiator to said retainer;
    said retainer having a second portion engaging said body of plastic material and securing said retainer to said cover.

10. An apparatus as set forth in claim 9 wherein said cover is made from metal and said retainer is made from metal, said retainer engaging a plastic portion of said initiator, said body of plastic material electrically insulating between said housing and said retainer.

11. An apparatus as set forth in claim 9 wherein said retainer has a generally annular main body portion centered on an axis, said first portion of said retainer extending from said main body portion in a direction toward said axis, said second portion of said retainer extending from said main body portion in a direction away from said axis.

12. An apparatus for inflating an inflatable vehicle occupant protection device, said apparatus comprising:

a housing including a main portion defining a chamber and having an opening into said chamber;

said housing further including a cover for closing said opening;

a body of plastic material molded on said cover;

an actuatable inflation fluid source in said chamber;

an electrically energizable initiator for actuating said inflation fluid source; and a retainer for mounting said initiator to said housing in a position projecting into said chamber in said housing, said retainer having a first portion engaging said initiator and securing said initiator to said retainer;

said retainer having a second portion engaging said body of plastic material and securing said retainer to said cover, said first portion of said retainer comprising a plurality of tabs which engage in a recess in said initiator.

13. An apparatus as set forth in claim 12 wherein said tabs extend at an angle to the plane of said main body portion of said retainer when said retainer is in a free condition, said tabs being resiliently deformed toward said plane when said tabs are engaged in said recess in said initiator.

14. An apparatus as set forth in claim 12 wherein said first portion of said retainer comprises a plurality of inner tabs which engage in a groove in said initiator, said inner tabs extending at an angle to the plane of said main body portion of said retainer when said retainer is in a free condition, said inner tabs being resiliently deformed toward said plane when said tabs are engaged in said groove in said initiator;

said second portion of said retainer comprising a plurality of outer tabs which engage in a groove in said body of plastic material, said outer tabs extending at an angle to the plane of said main body portion of said retainer when said retainer is in a free condition, said outer tabs being resiliently deformed toward said plane when said tabs are engaged in said groove in said body of plastic material.

15. An apparatus for inflating an inflatable vehicle occupant protection device, said apparatus comprising:

a housing including a main portion defining a chamber and having an opening into said chamber;

said housing further including a cover for closing said opening;

a body of plastic material molded on said cover;

an actuatable inflation fluid source in said chamber;

an electrically energizable initiator for actuating said inflation fluid source; and a retainer for mounting said initiator to said housing in a position projecting into said chamber in said housing, said retainer having a first portion engaging said initiator and securing said initiator to said retainer;

said retainer having a second portion engaging said body of plastic material and securing said retainer to said cover, said second portion of said retainer comprising a plurality of tabs which engage in a recess in said body of plastic material.

16. An apparatus as set forth in claim 15 wherein said tabs extend at an angle to the plane of said main body portion of said retainer when said retainer is in a free condition, said tabs being resiliently deformed toward said plane when said tabs are engaged in said recess in said body of plastic material.

* * * * *